United States Patent [19]

Schweitzer et al.

[11] 4,404,467
[45] Sep. 13, 1983

[54] SALINITY AND LITHOLOGY DETERMINATION FROM THE SODIUM AND CHLORINE ACTIVATION LINES

[75] Inventors: Jeffrey S. Schweitzer, Ridgefield, Conn.; Ralph M. Tapphorn, Boulder, Colo.

[73] Assignee: Schlumberger Technology Corporation, New York, N.Y.

[21] Appl. No.: 202,454

[22] Filed: Oct. 31, 1980

[51] Int. Cl.³ ............................................. G01V 5/10
[52] U.S. Cl. .................................... 250/270; 250/269
[58] Field of Search ....................... 250/270, 269, 262

[56] References Cited

U.S. PATENT DOCUMENTS

| 2,943,197 | 6/1960 | De Witte ............................. 250/270 |
| 2,991,364 | 7/1961 | Goodman . | |
| 3,139,528 | 6/1964 | Johnson ............................. 250/270 |
| 3,219,820 | 11/1965 | Hall, Jr. . | |
| 3,257,557 | 6/1966 | Youmans . | |
| 3,304,424 | 2/1967 | Mills, Jr. . | |
| 3,413,471 | 11/1968 | Tittman . | |
| 3,484,609 | 12/1969 | Pritchett et al. . | |
| 3,521,064 | 7/1970 | Moran et al. . | |
| 3,566,117 | 2/1971 | Tixier . | |
| 3,590,228 | 6/1971 | Burke . | |
| 3,662,173 | 5/1972 | Youmans . | |
| 3,665,195 | 5/1972 | Youmans . | |
| 3,781,545 | 12/1973 | Paap et al. . | |
| 3,838,279 | 9/1974 | Schultz et al. ....................... 250/270 |
| 3,930,154 | 12/1975 | Scott ................................... 250/270 |
| 3,943,362 | 3/1976 | Peelman .............................. 250/270 |
| 4,020,342 | 4/1977 | Smith, Jr. et al. .................. 250/270 |
| 4,055,763 | 10/1977 | Antkiw ................................ 250/270 |
| 4,191,884 | 3/1980 | Scott .................................... 250/270 |
| 4,208,580 | 6/1980 | Schweitzer et al. ................ 250/270 |

OTHER PUBLICATIONS

"Using Nuclear Methods in Oil-Well Logging" by R. L. Caldwell, from the Dec. 1958, Issue of Nucleonics, pp. 58-65.

"Log Analysis in Formations with Complex Lithologies" by A. Poupon, W. R. Hoyle and A. W. Schmidt, Aug. 1971, Issue of the Journal of Petroleum Technology, pp. 995-1004.

"Field Experience in Measuring Oil Content, Lithology and Porosity With a High-Energy Neutron-Induced Spectral Logging System" by W. A. Hoyer and R. C. Rumble, Journal of Petroleum Technology, 7/65, pp. 801-807.

Primary Examiner—Alfred E. Smith
Assistant Examiner—Carolyn E. Fields
Attorney, Agent, or Firm—Brumbaugh, Graves, Donohue & Raymond

[57] ABSTRACT

In the illustrative embodiments of the invention disclosed, the lithology and salinity of an earth formation traversed by a well bore are investigated by irradiating the formation with a neutron source and generating an energy spectrum of the activation gamma rays resulting therefrom. From the spectrum thus obtained, the level of the activation gamma radiation emitted by $^{24}$Na and that emitted by $^{38}$Cl are determined. The two intensity measurements are then combined, e.g., by forming a cross-plot or ratio thereof, to provide an indication of the lithology and salinity of the earth formation.

12 Claims, 4 Drawing Figures

SALINITY AND LITHOLOGY DETERMINATION FROM THE SODIUM AND CHLORINE ACTIVATION LINES

BACKGROUND OF THE INVENTION

THE PRIOR ART

Heretofore, various procedures have been known for investigating the mineral composition, or lithology, and salinity of earth formations. In U.S. Pat. No. 3,566,117 to Tixier, one such technique is described in which porosity-dependent signals derived from a two-detector neutron porosity tool are cross-plotted against bulk density-related signals from a two-detector gamma-gamma mudcake compensated density tool to provide an indication of lithology. Another method, described in U.S. Pat. No. 3,590,228 to Burke, combines measurements of sonic travel time, bulk density, and neutron-derived porosity to derive two lithology indices, known as M and N indices, which are then compared, e.g., by cross plotting, to identify the major lithological constituents of the formation. Several other methods are known to obtain lithology information from combinations of sonic, density, and neutron measurements. One such method, known as the Dual Mineral Method, uses a cross-plot of the neutron and density data to arrive at values of porosity and apparent matrix density of the formation. The sonic measurement is then used to indicate zones of secondary porosity and to help define the lithology. A more general method, which is based on the dual Mineral Method, has been developed for lithology interpretations of formations having mixtures of silica, limestone, dolomite, anhydrite, and clay, or that are mixtures of any two specified minerals plus clay, and takes into account both formation shaliness and hydrocarbon effects. The above techniques are described in detail by Poupon et al. in "Log Analysis in Formations with Complex Technologies," Journal of Petroleum Technology, August, 1971, pp. 995-1005. These foregoing techniques, while generally providing an accurate indication of the formation lithology, all require data to be measured by at least two different types of logging tools.

Methods are known, however, which do not require such multiple tool data gathering operations. U.S. Pat. No. 4,055,763 to Antkiw, for example, discloses a method for using a gamma ray spectroscopy tool to identify the lithology of earth formations based on measurements of the relative proportions of selected elements in the formation. For instance, by determining the relative contributions of silicon, calcium and iron to the capture gamma ray spectrum of the formation and then forming various ratios of the measured elemental contributions, it is possible to detect the presence of shales or determine whether the formation is limestone or sandstone. A generally similar method to that of Antkiw is described in U.S. Pat. No. 3,930,154 to Scott et al. wherein, following constituent analysis of the capture gamma ray energy spectrum for a formation of unknown lithology to obtain the relative constituent proportions, the volume fractions of the various constituents are calculated and ratios of certain volume fractions are formed to provide indications of lithology, including a dolomite/limestone indicator. Although these spectroscopy techniques afford useful lithology indicators, it is desirable to provide still further information regarding the lithological make-up of formations. It is also desirable to provide an improved, straightforward spectroscopy technique for determining salinity.

One prior art scheme for determining salinity is to measure the rate of decay of thermal neutrons in a formation. This technique, however, has two drawbacks. First, it does not always afford reliable results in low salinity environments. Second, it is based on the assumption that all salts present are sodium chloride. Erroneous results occur in the presence of other salts such as calcium chloride. A method capable of accurately determining salinity regardless of the quantity and the kind of salts present is therefore desirable. between irradiation and detection, turbulence occurs within the borehole, mixing irradiated borehole fluid with unaffected borehole fluid. Such mixing significantly reduces the incidence of detection of irradiated elements in the borehole fluid, thereby eliminating the need for a borehole fluid excluder which tends to interfere with logging operations.

BRIEF DESCRIPTION OF THE DRAWINGS

Further objects and advantages of the invention will be apparent, and a better understanding of the invention will be gained, from the following description of the preferred embodiments, taken in conjunction with the accompanying drawings, in which.

DETAILED DESCRIPTION

Figures 1, 4:
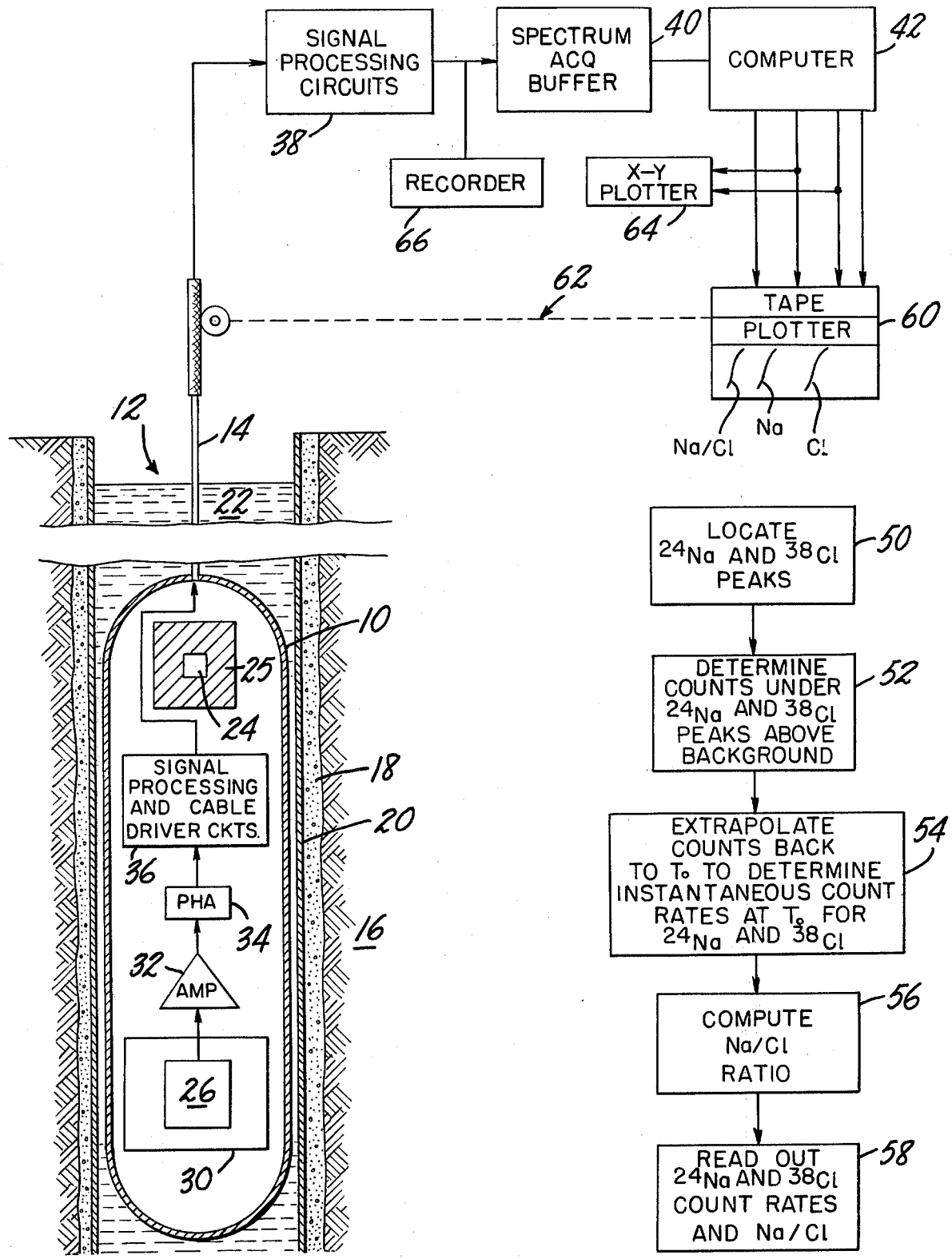
FIG. 1 is a schematic view of an embodiment of logging apparatus constructed in accordance with the invention.
FIG. 4 shows a flow diagram for carrying out analysis of an activation gamma ray spectrum to identify the sodium-24 and chlorine-38 contributions and thereafter for determining an indicator of lithology and salinity therefrom.

Referring now to the drawings and in particular to FIG. 1, a representative embodiment of the invention includes a fluid tight, pressure and temperature resistant well tool or sonde 10 that is adapted to be suspended in a well bore 12 by an armoured cable 14 for investigating a sub-surface earth formation 16. The well bore 12 is illustrated as cased, including the usual annulus of cement 18 and steel casing 20 and as containing a well fluid 22. Although no tubing is shown in the well bore, the tool if desired may be sized for through-tubing use. It will be understood that the invention has application also to open hole logging.

The sonde 10 includes a neutron source 24 and a gamma ray detector 26. The neutron source 24 may comprise either a chemical source as shown, such as californium-252, plutonium-beryllium or americium-beryllium, in which case it is suitably encapsulated in a shield 25, or a pulsed neutron generator, such as that described and illustrated in U.S. Pat. No. 2,991,364 to Goodman. For the purpose of the present invention, a californium-252 source is employed since the majority of the neutrons emitted thereby have energies below the (n,p) activation threshold level of magnesium-24, thereby avoiding possible contamination of the $^{23}Na(n,\beta)^{24}Na$ activity with the $^{24}Mg$ (n,p)Na activity.

Higher energy source could of course be used if such contamination is not a problem or if higher neutron yields are desired.

Where a continuous neutron source is used, the source 24 is preferably spaced sufficiently far from the detector 26 that initial gamma ray activity resulting from The ability to obtain salinity measurements that are insensitive to borehole fluid salinity is also desirable. During activation, the borehole fluid surrounding the sonde will also be activated. When readings are taken, the borehole fluid activation will introduce error if it is not accounted for in some fashion.

SUMMARY OF THE INVENTION

The foregoing and other objects of the invention are attained by the provision of methods, and of apparatus for the practice thereof, for irradiating an earth formation whose lithology and salinity are to be investigated with neutrons to produce the activation reactions $^{23}Na(n,\gamma)^{24}Na$, and $^{37}Cl(n,\gamma)^{38}Cl$, separately measuring the intensities of the gamma rays resulting from the decay of the unstable isotopes $^{24}Na$ and $^{38}Cl$, and combining the $^{24}Na$ and $^{38}Cl$ gamma ray measurements to provide an indication of the formation lithology and salinity.

Activation spectroscopy using a Ge spectrometer provides an accurate determination of the sodium and chlorine concentrations. A cross-plot of sodium and chlorine can be used to determine the formation salinity and the presence of sodium bearing minerals such as shale, siltstone and granite. It may also reveal the presence of chlorides other than NaCl. The cross-plot may be formed in any suitable way, as, for example, by a X-Y plotter. Alternatively, a ratio function of the sodium and chlorine count rates may be formed.

An important feature of this technique is its insensitivity to the borehole fluid. When the tool is raised inelastic scattering and thermal capture reactions will have substantially dissipated by the time the detector reaches the irradiation site. The source-detector spacing should also be large enough to avoid damage to the detector due to direct neutron irradiation and to minimize activation of the detector and adjacent tool components. A suitable spacing, therefore, for a chemical source and a germanium spectrometer might be on the order of 20 feet. Where a pulsed source is used, the source 24 may be located much closer to the detector 26. In this case, the activity resulting from inelastic scattering and thermal capture reactions may be eliminated from the activation spectral data by appropriate time gating circuits. Appropriate shielding may be provided to minimize detector damage and activation.

The gamma ray detector 26 may be of any suitable type having sufficient resolution to identify desired energy peaks (no worse than 10 keV and preferably 2 keV or better at $E\gamma < 1$ Mev), and preferably is a high resolution, solid state detector such as a high purity germanium (HPGe) detector or a lithium-drifted germanium (Ge(Li)) detector. As such detectors operate reliably only at cryogenic temperatures, the detector 26 is encased in a cryostat 30. Although any suitable cryostat may be used, the cyrostat disclosed in the copending, commonly-owned U.S. Pat. 4,241,592, filed Oct. 3, 1977 by Ralph M. Tapphorn, co-applicant herein, is preferred for this purpose. The Tapphorn cryostat is capable of holding the detector at approximately $-180°$ C. for upwards of 15 hours.

Electrical power for the sonde 10 is supplied through the cable 14 from a source of power (not shown) at the surface. Suitable power sources (not shown) are also included in the sonde 10 for driving the detector 26 and other downhole electronics, including the neutron source 24 when a pulsed source is used.

After an earth formation has been irradiated with the neutron source 24 for a specified period of time, the sonde 10 is raised until the detector 26 is moved into position adjacent the irradiated formation, whereupon it detects gamma ray emissions resulting from the irradiation. It will be understood that logging may be either continuous or point-by-point. The time required to position the detector opposite the irradiated site (approximately 30 seconds for a 20 foot source-detector spacing) provides a time delay during which inelastic scattering gamma rays and thermal neutron capture gamma rays may dissipate prior to the initiation of the measurement period. As will be appreciated, some measure of control over the length of this time delay may be had by varying one or both of the source-detector spacing and the speed of movement of the sonde 10. A further advantage of taking the spectra by irradiating the formation at a point spaced well from the detector and thereafter moving the detector opposite the irradiation point is that the movement of the sonde through the source-detector distance tends to displace the activated well fluid along the well bore, thereby reducing the level of unwanted borehole gamma ray activity detected.

Following amplification in amplifier 32, the output pulses from the detector 26 are applied to a pulse height analyzer (PHA) 34, which may be of any conventional type such as a single ramp (Wilkinson rundown) type. It may comprise a multi-channel device, as shown in FIG. 1, for use in generating an energy spectrum such as that shown in FIG. 2, or it may comprise a plurality of single-channel analyzers that are set to detect only the energy range of interest. The PHA 34 will be understood to include the usual pulse height discriminators for selection of the gamma ray energy range to be analyzed, and, where a pulsed neutron source is employed, time gating circuits for control of the time portion of the detector signal train to be analyzed.

The PHA 34 segregates the detector pulses into predetermined channels according to their amplitude and supplies signals in suitable digital form representing the amplitude of each analyzed pulse. The channel width should be no wider than the resolution of the detector, and preferably less, e.g. on the order of 1 keV per channel for a Ge(Li) activation gamma ray spectrum. Hence for a typical activation gamma ray spectrum spanning say 4.0 MeV, a 4,000 channel analyzer is preferred.

The digital output signals of the PHA 34 are delivered to downhole signal processing and cable driver circuits 36 where the data is temporarily stored and then transmitted to signal processing and cable interface circuits 38 at the surface. The signal processing and cable driver/interface circuits 36 and 38 may be of any suitable known construction for encoding and decoding, multiplexing and demultiplexing, amplifying and otherwise processing the signals for transmission to and reception at the surface, and the details thereof do not comprise a part of the present invention. Advantageously, however, the data telemetering system described in detail in the copending, commonly-owned U.S. Pat. No. 4,355,310, filed Aug. 6, 1979 by Belaigues et al. is employed. Alternatively, the circuits described in U.S. Pat. No. 4,012,712 to William B. Nelligan may be used.

At the surface, the activation gamma ray spectra are acquired by a data acquisition buffer 40, which accumulates the counts-per-channel signals for a period long enough to give a statistically satisfactory spectrum, but preferably in time segments short enough to allow for a half-life analysis where needed to differentiate between interfering lines or to otherwise identify emitters. For example, the spectra may be acquired in intervals of 1 minute, 5 minutes, etc., and then summed for the peaks of interest over the entire counting period if greater statistical certainty is required. Due allowance must of course be given in summing the spectra for decay of the peaks over the counting period.

Following accumulation in the acquisition buffer 40, the activation spectrum is transferred to storage buffers (not shown) in a computer 42, and the acquisition buffer 40 is reset to zero. Both the acquisition buffer and the storage buffers are conventional and need not be described here. The computer may comprise a general purpose digital computer, such as the PDP-11 measured by the Digital Equipment Corporation, Maynard, Mass., or, alternatively, it may comprise an analog computer. In either case, the computer 42 is suitably programmed or constructed, as illustrated and described hereinafter in connection with FIG. 4, to identify the energy peaks, and thereafter to normalize and correct the raw count rate data for use in developing lithology and salinity information in accordance with the invention.

Figure 2:
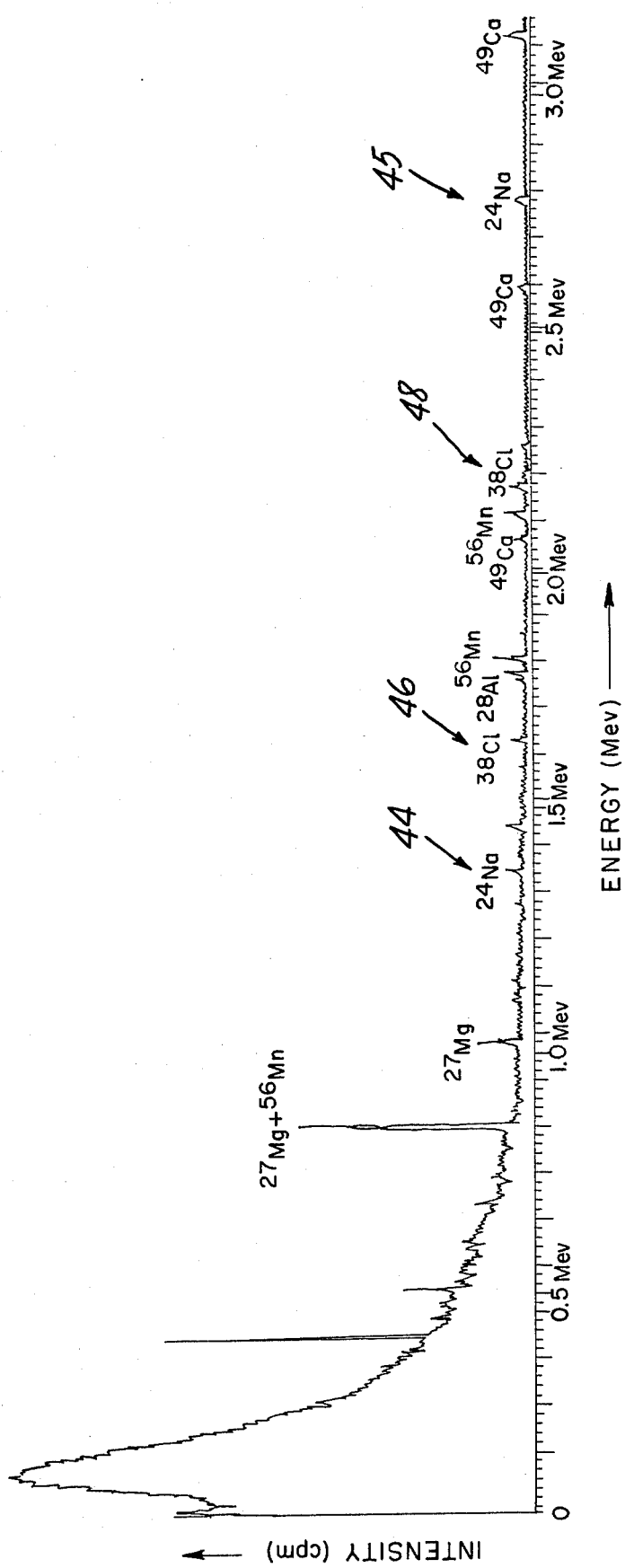
FIG. 2 is a graphical representation illustrating a typical Ge(Li) activation gamma ray energy spectrum of an earth formation irradiated with neutrons from a californium-252 source.

A typical activation spectrum obtained using a californium-252 source and a high resolution Ge(Li) detector is shown in FIG. 2. The earth formation irradiated was a dolomite composition, and after irradiation for 30 minutes, data was accumulated in contiguous time periods for a total counting time of one hour. These data were then summed to produce the FIG. 2 spectrum. It will be understood that the 1 hour accumulation time used in acquiring the spectrum of FIG. 2 is illustrative only, and that shorter accumulation times may be used in accordance with the invention. Indeed, good data can be obtained under actual logging conditions with significantly shorter counting times.

In accordance with the invention, the gamma ray activities produced as a result of the sodium activation reaction $^{23}$Na(n,$\gamma$)$^{24}$Na and the chlorine activation reaction $^{37}$Cl(n,$\gamma$)$^{38}$Cl are to be measured and then combined to provide an indication of formation lithology and salinity. In determining the activity under each peak, the computer 42 is first instructed at 50 (see FIG. 4) to locate the $^{24}$Na and $^{38}$Cl peaks 44, 45, 46 and 48, and then, at 52, to determine the area (or number of counts) thereunder above background. This may be done in a number of known ways, and various programs are available from computer software and/or hardware suppliers for such purpose. The raw intensity data is then normalized and corrected to more accurately reflect the elemental concentrations in the formation. As indicated in FIG. 4 in box 54, this may be done by extrapolating all activity back to the time when irradiation of the formation ceased, time zero ($T_0$), to determine the initial activity of each element. Alternatively, the total activity from time zero until infinity may be the basis for normalization. This accounts for the different half-lives of the elements and the time delays in taking the measurements. In addition to normalizing for the time after irradiation when measurements are taken, if the radiation time itself is changed during logging such differences must also be taken into account in the normalization step. Once the instantaneous count rates at $T_0$ for the elements have been determined, the computer 42, under instruction at 56, then combines the count rate measurements to provide an indication of lithology and salinity.

Figure 3:
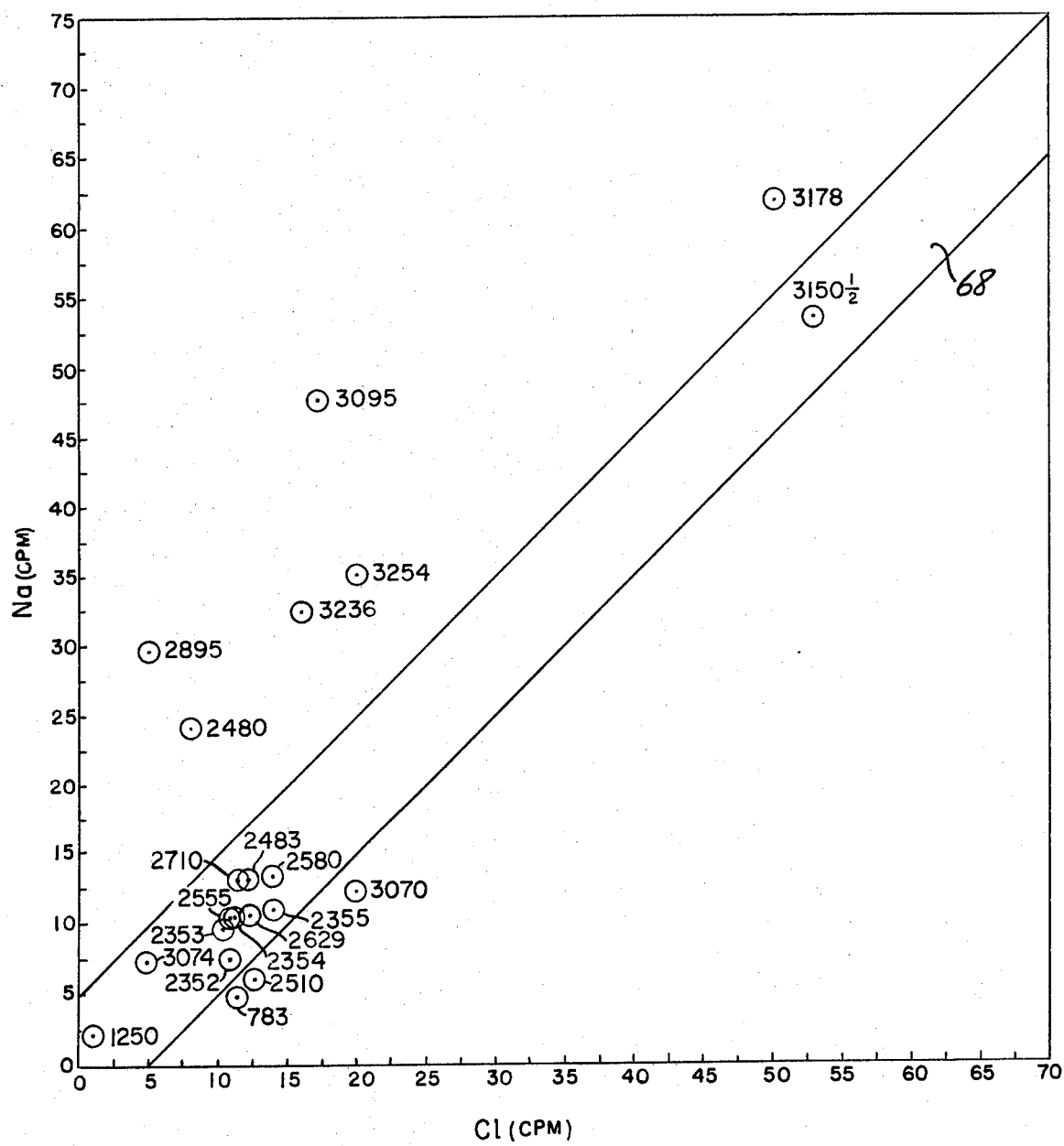
FIG. 3 is a typical cross-plot of sodium and chlorine counts for indicating the lithology and salinity of the formation in accordance with the invention.

As mentioned above, measurement of the sodium and chlorine activation levels in accordance with the invention is substantially insensitive to borehole fluid salinity. FIG. 3 represents a plot of the instantaneous count rates at $T_0$ for $^{24}$Na versus $^{38}$Cl, in counts per minute, as measured at various borehole depths. Data for this plot is listed in Table 1, below. The depth in feet and the lithology is indicated for each measurement. A diagonal band 68 extending at 45° from the origin divides the plot into two main regions.

The diagonal band 68 is representative of formation fluids containing sodium chloride. Salinity increases with the distance from the origin. The width of the band indicates the typical range of the statistical uncertainties in the measurements. Thus, one may reasonably assume that any point falling within the band primarily represents the concentration of sodium chloride in the formation, i.e., salinity. On the other hand, measurements that primarily reflect lithology would group in areas outside of the band.

TABLE 1

| Depth (ft.) | Na (CPM) | Cl (CPM) | Lithology |
|---|---|---|---|
| 783 | 4.8 | 11.3 | Quartz |
| 1250 | 2.1 | 1.1 | Quartz |
| 2074 | 7.4 | 4.9 | Dolomite |
| 2352 | 7.5 | 10.9 | Dolomite |
| 2353 | 9.7 | 10.4 | Dolomite |
| 2354 | 10.5 | 11.2 | Dolomite |
| 2355 | 11.1 | 14.1 | Dolomite |
| 2480 | 24.2 | 8.1 | Shale |
| 2483 | 13.4 | 12.1 | Dolomite |
| 2510 | 6.0 | 12.6 | Limestone |
| 2555 | 10.5 | 10.8 | Shale |
| 2580 | 13.4 | 14.0 | Shaly Lime |
| 2629 | 10.7 | 12.1 | Lime with chert |
| 2710 | 13.1 | 11.5 | Lime with chert |
| 2895 | 28.9 | 5.0 | Siltstone |
| 3070 | 12.3 | 20.0 | Limestone |
| 3095 | 47.8 | 17.1 | Siltstone |
| 3150 ½ | 53.5 | 52.8 | Shale |
| 3178 | 61.7 | 50.1 | Shale |
| 3236 | 32.5 | 16.2 | Quartz |
| 3254 | 35.2 | 20.0 | Granite |

Points that lie above the band represent data for which the sodium concentration exceeds the concentration of chlorine, and it would be expected that the formations associated with such points contain sodium mineralization. This might further indicate, for example, the presence of shales, siltstones, or granite.

Points appearing below the band represent data where the concentration of chlorine exceeds the sodium concentration. Such points are indicative of non-sodium chloride salts, e.g., calcium chloride.

Information regarding the lithology of the formation may be obtained from consideration of the data of FIG. 3 and Table 1. For example, in regions where the sodium count rates are higher than the chlorine count rates, one would be likely to find deposits of Na-bearing minerals, which are likely to occur, for example, in shales, siltstones, or granite. Examples of these lithologies are seen in Table 1 at 3,178 feet (shale), 3,095 feet (siltstones), and 3,254 feet (granite). In regions where both the sodium count rate and the chlorine count rate are enhanced, such as at the shale at 3,150 feet and the shale at 3,178 feet, sodium chloride salt water may also be present.

It will be appreciated that the information regarding formation salinity and formation lithology can be obtained by taking the ratio of $^{24}$Na and $^{38}$Cl count rates. Where only sodium chloride salt water is detected, the sodium-chlorine ratio should be a constant value independent of salt concentration. Hence any measured sodium and chlorine activity levels which yield a ratio at or near the expected constant value will be indicative of pure sodium chloride salt water. In this case, either the sodium count rate, the chlorine count rate, or the total of the two count rates may be recorded as an indication of the concentration of NaCl in the formation.

After performing the normalization step indicated at box 54 in FIG. 4, the computer 42 computes the desired ratio, e.g., the Na/Cl ratio as indicated at 56 in FIG. 4, from the $^{24}$Na and $^{38}$Cl count rates at $T_0$, and then, as shown at 58 in FIG. 4, reads out the ratio value and the instantaneous count rates for both elements. As shown in FIG. 1, these values are applied to a tape plotter 60 for display. The tape plotter 60 is conventional, and includes the necessary components for making either, or both, a visual plot or a magnetic record of the measured count rate and ratio values as a function of tool depth. The usual cable-following linkage, indicated diagramatically at 62, is provided for this purpose. If desired the $^{24}$Na and $^{38}$Cl outputs from the computer 42 may be applied to an X-Y plotter 64 to generate a crossplot of the sodium and chlorine count rates. Such X-Y plotters are conventional and are available, for example, from California Computer Products.

Although the computer 42 is depicted in FIG. 1 as being located at the well site, it may if desired be located remotely and operated on recorded representations of the counts-per-channel data transmitted over the cable 14. To that end, the output signals from the signal processing and cable interface circuits 38 may be recorded directly as a function of depth on a tape recorded or mass storage disk 66 as shown in FIG. 1. Such recorded data could be processed by the computer to provide the count rate and ratio outputs or, alternatively, could be used to drive an X-Y plotter, as aforementioned.

As mentioned above, a pulse neutron source may be used in place of the continuous source. Whereas with a continuous source a combination of the source-detector spacing and/or the logging speed are used to gate or screen out radiation resulting from inelastic scattering and thermal capture reaction, with a pulsed source the detector and source may be placed closer together, separated by a suitable neutron barrier. Since the source may be turned on and off, radiation resulting from activation may be isolated, and the length of the data sampling controlled, by appropriate time gating circuits. This gating may be done either in the logging tool or uphole. The advantage in placing the source near the detector is in being able to detect elements having very short half lives, e.g., on the order of one second or less, where it would not be possible to move a tool having any significant source-detector spacing into place fast enough to detect these elements.

Although the invention has been illustrated and described herein with reference to specified embodiments thereof, it will be understood that such embodiments are susceptible of modification and variation without departing from the inventive concepts embodied therein. For example, instead of using a multichannel analyzer and programmed digital computer to measure the $^{24}$Na and $^{38}$Cl count rates, the measurements could be made using a pair of single-channel analyzers and associated count rate meters, and the ratio could be formed in a ratio taking circuit. Circuits for carrying out these steps are well known and readily available in the marketplace. All such modifications and variations, therefore, are intended to be encompassed within the spirit and scope of the appended claims.

We claim:

1. A method for investigating the lithology and salinity of an earth formation traversed by a well bore, comprising the steps of:
    (a) irradiating an earth formation with neutrons to produce therein the neutron activation reactions $^{23}$Na(N,$\gamma$)$^{24}$Na and $^{37}$Cl(n,$\gamma$)$^{38}$Cl;
    (b) selectively measuring, from among the total gamma ray activity resulting from said irradiation, the level of gamma ray activity resulting from the decay of $^{24}$Na using a high resolution gamma ray detector;
    (c) selectively measuring, from among the total gamma ray activity resulting from said irradiation, the level of gamma ray activity resulting from the decay of $^{38}$Cl using a high resolution gamma ray detector; and
    (d) combining said $^{24}$Na gamma ray measurement and said $^{38}$Cl gamma ray measurement to provide an indication of at least one of the lithology and salinity of the earth formation.

2. The method of claim 1 wherein the combining step comprises forming a ratio function of the $^{24}$Na gamma ray measurement and the $^{38}$Cl gamma ray measurement.

3. The method of claim 2 further comprising the step of recording the $^{24}$Na and $^{38}$Cl gamma ray measurements and the value of said ratio function as a function of tool depth.

4. A method for investigating the lithology and salinity of an earth formation traversed by a well bore, comprising the steps of:
    (a) providing representations in the form of signals of the gamma ray activity resulting from the decay of $^{24}$Na following the activation thereof by neutron irradiation;
    (b) providing representations in the form of signals of the gamma ray activity resulting from the decay of $^{38}$Cl following the activation thereof by neutron irradiation;
    (c) selectively deriving, from among the total gamma ray activity resulting from neutron irradiation of the earth formation, separate measurements of the levels of said $^{24}$Na and $^{38}$Cl gamma ray activities from said respective representations; and
    (d) combining said $^{24}$Na gamma ray measurement and said $^{38}$Cl gamma ray measurement to provide an indication of at least one of the lithology and salinity of the earth formation.

5. The method of claim 4 wherein the combining step comprises forming a ratio function of the $^{24}$Na gamma ray measurement and $^{38}$Cl gamma ray measurement.

6. Apparatus for investigating the lithology and salinity of an earth formation traversed by a well bore comprising:

(a) means for irradiating an earth formation with neutrons to produce therein the neutron activation reactions $^{23}Na(n,\gamma)^{24}Na$ and $^{37}Cl(n,\gamma)^{38}Cl$;

(b) high resolution gamma ray detector means for detecting gamma rays resulting from the decay of unstable isotopes of the formation;

(c) means coupled to said detector means for selectively measuring, from among the total gamma ray activity from said decay, the level of gamma ray activity resulting from the decay of $^{24}Na$ and the level of gamma ray activity resulting from the decay of $^{38}Cl$; and (d) means for combining the $^{24}Na$ gamma ray measurement and the $^{38}Cl$ gamma ray measurement to provide an indication of at least one of the lithology and salinity of the earth formation.

7. The apparatus of claim 6 wherein said combining means includes means for forming a ratio function of the $^{24}Na$ gamma ray measurement and the $^{38}Cl$ gamma ray measurement.

8. The apparatus of claim 7 further comprising means for recording the $^{24}Na$ and $^{38}Cl$ gamma ray measurement and the value of said ratio function as a function of tool depth.

9. A method for investigating the lithology and salinity of an earth formation traversed by a well bore, comprising the steps of:

(a) placing an elongate sonde, having an irradiating source and a detector, in the well bore, said source and said detector being spaced apart lengthwise of said sonde;

(b) irradiating an earth formation with neutrons to produce activation reactions therein;

(c) moving the sonde to place the detector opposite the activated formation; and (d) selectively measuring, from among the total gamma ray activity resulting from said irradiation, the levels of gamma ray activity resulting from the decay of $^{24}Na$ and $^{38}Cl$.

10. The method of claim 9 wherein the $^{24}Na$ gamma ray measurement and the $^{38}Cl$ gamma ray measurement are combined to provide an indication of at least one of the lithology and salinity of the earth formation.

11. The method of claim 10 wherein the combining step comprises forming a ratio function of the $^{24}Na$ gamma ray measurement and the $^{38}Cl$ gamma ray measurement.

12. The method of claim 11 further comprising the step of recording the $^{24}Na$ and $^{38}Cl$ gamma ray measurements and the value of said ratio function as a function of sonde depth.

* * * * *

UNITED STATES PATENT AND TRADEMARK OFFICE
CERTIFICATE OF CORRECTION

PATENT NO. : 4,404,467

DATED : September 13, 1983

INVENTOR(S) : Jeffrey S. Schweitzer and Ralph M. Tapphorn

It is certified that error appears in the above-identified patent and that said Letters Patent is hereby corrected as shown below:

Col. 1, following the title of the patent and after BACKGROUND OF THE INVENTION, insert as a new paragraph:

--FIELD OF THE INVENTION

The present invention relates in general to gamma ray spectroscopy well logging and, more particularly, to improved methods and apparatus for investigating the lithology and salinity of earth formations by neutron activation gamma ray spectroscopy.--

Col.2, line 12, after "desirable." insert the text from Col. 3, lines 8-38 --The ability to obtain salinity...tool is raised--;
Col. 2, line 68, "(n,$\beta$) should read --(n,$\gamma$)--;
Col. 3, delete lines 8 through 38;
Col. 4, line 39, "range" should read --ranges--;
Col. 5, line 22, "measured" should read --manufactured--.

Signed and Sealed this

Third Day of April 1984

[SEAL]

Attest:

GERALD J. MOSSINGHOFF

Attesting Officer

Commissioner of Patents and Trademarks